United States Patent Office 2,718,498
Patented Sept. 20, 1955

2,718,498
EMULSION MUD

Richard A. Salathiel, Houston, Tex., assignor, by mesne assignments, to Esso Research and Engineering Company, Elizabeth, N. J., a corporation of Delaware No Drawing. Application June 28, 1951,
Serial No. 234,147

13 Claims. (Cl. 252—8.5)

This invention relates to a drilling fluid and to a method for controlling the viscosity and filtration rate thereof. More particularly, this invention relates to an oil-in-water emulsion mud having a low filtration rate and a low viscosity and to a method of preparing such a mud.

In the art of drilling boreholes into subsurface formations by the rotary drilling method, it is common practice to employ a drilling fluid. Both aqueous and non-aqueous, or oil base, drilling fluids have been used for this purpose. The aqueous drilling fluids normally comprise water, colloidal material of both gel-forming and non-gel-forming types, and weighting materials, the solid materials being suspended in the water. The non-aqueous, or oil base, drilling fluids normally consist of a non-aqueous liquid, such as crude oil or a petroleum distillate, and colloidal material or weighting material, or both.

While aqueous-base drilling fluids are more widely used than oil-base fluids, they often possess a marked tendency to lose water to the formation being drilled through and, accordingly, are detrimental to some of these formations. Consequently, where it is desirable not to subject the formation being drilled to the action of large quantities of water, drilling fluids having little tendency to lose water are employed. It is in situations where even moderate amounts of water are objectionable that oil-base muds find their widest application.

In addition to aqueous drilling fluids and non-aqueous drilling fluids, emulsion-type drilling fluids are also known. Emulsion-type drilling fluids consist of a substantially water-insoluble liquid, such as oil, a colloidal material, such as clay, weighting material, and water, together with a suitable suspending or dispersing agent. The mixture of these components forms a water-in-oil emulsion or an oil-in-water emulsion, depending upon the character of the water-insoluble liquid, upon the proportion in which it is present relative to the water, and upon the character of the suspending or dispersing agent.

Ideally, the suspending or dispersing agent should not only suspend or disperse the solid components in the liquids and the liquids in each other but should also contribute to other desirable mud properties. For example, soaps commonly used in emulsion drilling fluids not only act efficiently as suspending or dispersing agents but also contribute strongly to lowering the filtration rates of the fluids to which they are added. However, soaps have the undesirable property of increasing strongly the viscosity of the drilling fluid to which they are added. In addition, their efficiency as filtration rate reducers is markedly impaired by contamination from salt water, gypsum, or cement.

Lignosulfonates and lignite extracts, like soaps, have been used in emulsion muds as dispersing or suspending agents. Both of these materials have the advantage over soap of being less subject to loss of effectiveness by contaminants and do not increase the viscosity of the drilling fluid to which they are added to as large a degree as do the soaps. However, neither of these materials contributes strongly toward filtration reduction. Consequently, when either of these materials is used in a drilling mud, particularly in a saline mud, it is ordinarily advantageous to have present therein a filtration reducing agent, such as starch, in order to impart to the mud a desired low filtration rate.

It is an object of the present invention to provide an oil-in-water type drilling fluid having little tendency to lose water by filtration therefrom. It is a further object of the present invention to provide a method for reducing the loss of water from an aqueous dispersion or suspension of finely divided solid material. A further object of the present invention is to provide an agent which, on addition to an oil-in-water type emulsion drilling fluid, will substantially reduce the loss of water therefrom by filtration even in the presence of contaminants, but which will not increase excessively the viscosity of the drilling fluid.

According to the present invention, the filtration rate of an aqueous-base drilling fluid is controlled by adding to the aqueous-base drilling fluid a hydrocarbon oil and a sulfonated phenol formaldehyde condensation product, these materials being added to the aqueous-base drilling fluid in such a quantity as to form an oil-in-water emulsion having little tendency to lose water by filtration therefrom. This oil-in-water emulsion will also have little tendency to lose oil by filtration therefrom. It will be understood, of course, that the filtration-reducing properties of oil-in-water emulsion muds may be altered by adding sulfonated phenol formaldehyde condensation product thereto even though other emulsifying agents have been previously added. Thus, the aforementioned oil-in-water emulsion mud comprises finely divided solid inorganic material such as hydratable clay with or without a weighting agent, water, a hydrocarbon oil, and sulfonated phenol formaldehyde condensation product.

The aqueous-base drilling fluid to which the oil and sulfonated phenol formaldehyde condensation product is added may be any aqueous-base drilling fluid conventionally employed in the drilling of bore-holes into subsurface formations. These aqueous-base drilling fluids ordinarily contain clay, either fresh water or salt water, and weighting agents, such as barytes, calcium carbonate, iron oxide, and the like. They may also contain suitable suspending agents and various treating agents, such as phosphates or sodium hydroxide and quebracho, etc.

The hydrocarbon oil used in accordance with the present invention may consist of crude oil, topped crude oil, diesel fuel oil, kerosene, gas oil, or the like, or mixtures thereof. Preferably, a gas oil fraction or diesel fuel oil is employed.

The preparation of the aforementioned water soluble salts of sulfonated phenol formaldehyde condensation product must be carried out in such a way as to result in a material having the desired filtration reducing properties. The condensation product obtained is influenced by the nature of the starting materials used, the ratio of starting materials, the temperature at which the condensation reaction is conducted, reaction time, etc. In order to prepare water soluble salts of sulfonated phenol formaldehyde condensation product suitable for my purpose a sulfonated mono-cyclic aromatic compound, difunctionally reactive with formaldehyde, is condensed with formaldehyde to form a high molecular weight, water soluble product which is at least predominantly linearly polymeric. While many different sulfonated mono-cyclic aromatic compounds, difunctionally reactive with formaldehyde, may conceivably be employed, I have found sulfonated mono-cyclic phenolic materials eminently suitable. However, not all mono-cyclic phenolic materials are suitable for my purpose. For example, a phenol having a substituent group, other than the sulfonic acid residue, in a position ortho or para to the hydroxyl group contains only one position reactive with formaldehyde and will not, therefore, be capable of condensing with formaldehyde to give a high molecular weight product suitable for my purpose. On the other hand, a phenol containing a substituent group such as $CH_3$, $C_2H_5$—, Cl, or the like, in the meta position may be mono-sulfonated and will still contain two positions reactive with formaldehyde and thus will be capable of forming high molecular weight predominantly linear condensation products with formaldehyde which are useful for my purpose.

Because phenol (mono-hydroxy benzene) is readily available and is convenient to handle, I have used phenol in the examples included herein. It will be understood, however, that other suitable phenolic compounds of the class cited above would have been equally applicable. The first step in the preparation of the water soluble salts of sulfonated phenol formaldehyde condensation product from phenol is the sulfonation of the phenol. The sulfonation step is so conducted that the amounts of poly-sulfonated phenol and unsulfonated phenol are small. As is well known, the sulfonic acid residue in the mono-sulfonated phenol will be almost entirely in either the ortho or para position, with respect to the hydroxyl group, thus leaving two positions in the phenolic molecule reactive with formaldehyde. To insure the sulfonated product resulting from the sulfonation of phenol with sulfuric acid is predominantly mono-sulfonated, phenol is reacted with a slight molar excess of sulfuric acid at 100° C. for one-half hour. Under these conditions the mono-sulfonated phenol will consist predominantly of para-sulfonated phenol. However, the conditions under which the phenol is sulfonated are not critical and the aforementioned temperature and reaction time were chosen as convenient conditions for securing a predominantly mono-sulfonated phenol.

On completion of the aforementioned sulfonation step, an aqueous solution of formaldehyde is incorporated in the reaction products of the sulfonation step in order to carry out the condensation between the formaldehyde and the sulfonated phenol. The remaining unreacted sulfuric acid from the sulfonation step acts as the catalyst for the condensation reaction. The temperature at which this condensation reaction is carried out does not appear to affect critically the properties of the resulting product. In the examples included herein, the condensation reaction temperature was arbitrarily chosen to give a conveniently short condensation time while at the same time not giving a reaction rate so rapid as to preclude the stopping of the condensation reaction at the desired stage. Condensation reaction temperatures up to 100° C. may suitably be employed although lower temperatures, for example, 60° C., also result in desirable products so long as the condensation reaction is allowed to proceed for a sufficient length of time.

During the condensation reaction, the reaction mixture becomes increasingly viscous due to the increase in chain length of the sulfonated phenol formaldehyde condensation product. Accordingly, it is necessary to permit the reaction to proceed until the molecular weight of the condensation product becomes sufficiently high, but the reaction must be terminated at the proper time so as to prevent the condensation product from increasing in molecular weight to the point of becoming insoluble in water. When the reaction mixture has attained the proper viscosity, the reaction is terminated. The condensation reaction may be terminated by diluting the reaction mixture with water and quickly neutralizing the diluted mixture with a suitable alkaline inorganic agent capable of neutralizing any remaining sulfuric acid and of reacting with the sulfonic acid radicals in the condensation product to form water-soluble metal salts of the condensation product. Ammonium hydroxide, calcium hydroxide, or an alkali metal hydroxide such as sodium, potassium, or lithium hydroxide may conveniently be employed in the neutralization step.

When the desired condition has been reached, the reaction may also be terminated either by limiting carefully the amount of formaldehyde added or by using only a slight excess of formaldehyde and adding a small amount of chemical (e. g. phenol) capable of removing formaldehyde from the reaction mixture. The solution of crude products is then neutralized.

While the sulfonated phenol formaldehyde condensation product employed in accordance with the present invention and hereinbefore described is predominantly linearly polymeric, it will be understood, of course, that there will be some cross linkage between the predominantly linearly polymeric chain structures. For example, if the sulfonated phenol from the sulfonation step contains some unreacted phenol or some meta-sulfonated phenol, there will be some cross linkage between the predominantly linearly polymeric chain structures because both of the aforementioned phenolic materials have three positions reactive with formaldehyde. Such cross linkages are not objectionable so long as the condensation product is predominantly linearly polymeric. On the other hand, if the sulfonated phenol from the sulfonation step contains di-sulfonated phenol (ortho- para- di-sulfonated or di-ortho di-sulfonated phenol), there will be some phenolic materials present in the condensation reaction mixture which, due to having only one position reactive with formaldehyde, will serve to terminate chain growth by becoming the terminal group on the linear chain. It will be apparent, therefore, that an effort should be made to keep the di-sulfonated phenol content of the sulfonated phenol at a minimum so as to reduce the possibility of vicarious termination of chain length during the condensation step.

A water-soluble salt of sulfonated phenol formaldehyde condensation product having filtration reducing properties made in accordance with the hereinbefore described procedure was prepared in the following manner:

In a 3-neck flask fitted with a stirrer and a thermometer 75 grams of phenol was heated at 100° C. for ½ hour with 100 grams of concentrated sulfuric acid. A solution in 152 cc. water of 50 cc. (53.4 grams) of U. S. P. formaldehyde (about 37.1% by weight of formaldehyde) was added dropwise (the addition requiring ½ hour) while maintaining the temperature at 85° C. Then 100 cc. more water was added and the mixture held at 95° C. for 40 minutes. The viscosity of the hot reaction mixture reached 3.5 cps. and then would go no higher. Two cc. more formaldehyde was added and heating continued (at 95° C.) for 105 minutes. The viscosity reached 8.5 cps. and then failed to go higher. Then 1.3 cc. more formaldehyde was added and heating continued for 40 minutes. Viscosity reached 16.5 cps. and increased no more. Addition of 0.6 cc. more formaldehyde and heating for an hour increased the viscosity to a stable value of about 38 cps. Adding 0.2 cc. more formaldehyde and heating for 50 minutes increased the viscosity to 75 cps. Then 0.2 cc. more formaldehyde was added (total added 54.3 cc.). This caused the viscosity to increase rapidly. It reached 150 cps. in 12 minutes and obviously would have gone much higher. The reaction was stopped at this time by adding a solution of 5 grams phenol and 2 grams water. The viscosity of the hot reaction mixture dropped to a stable value of 135 cps. (It would have been better to use a smaller amount of phenol to stop this reaction because excess phenol induces some foaming in muds treated with the material.) The acidic solution was neutralized to a phenolphthalein end point by adding 120 cc. of 40% caustic soda solution. The neutralized solution after dilution to 725 grams by addition of water had a viscosity at 26° C. of 122 cps.

The crude sodium salts of sulfonated phenol formaldehyde prepared as described in the example and as used for treating muds in the examples contained as impurities sodium sulfate as well as low molecular weight organic materials. Roughly 40% of the solid content of the crude product was active material. If it is desired, the impurities may be removed from the active material by dialysis.

While the product described above is highly effective in reducing the loss of water by filtration from drilling fluids, it is to be understood that any product having a solution viscosity at 26° C. of at least about 5 centipoises at solution concentrations of 7.15% by weight, based on the weight of the phenol sulfonated, will also be effective. It has been found that when the condensation products are of a molecular weight insufficient to impart a viscosity of 5 centipoises at 26° C. when present in water in the aforementioned concentration, their effectiveness as filtration reducers is very low and may be non-existent. Preferably, the product should have a solution viscosity at 26° C. of more than about 400 centipoises at solution concentrations of 7.15% by weight, based on the weight of the phenol sulfonated.

The amount of water-soluble salts of sulfonated phenol formaldehyde condensation products required to give the desired reduction in loss of water by filtration from an oil-in-water emulsion drilling mud will vary with the circumstances over a reasonably wide range and the amount in each specific instance will depend upon the characteristics of the drilling fluid to be treated. Experience has shown, however, that between 0.1 weight per cent and 3.0 weight per cent of the active material, based upon the weight of the oil-in-water emulsion, will ordinarily give satisfactory results. In some instances, more or less than the aforementioned amounts may profitably be used. Usually, however, an amount within the range of 0.2 to 1.0 weight per cent will be preferred.

The crude water-soluble salts of sulfonated phenol formaldehyde condensation products obtained by the above-described procedure may be refined before use or they may be used in the crude form. Either the crude or refined form of the product may be added to the oil-in-water emulsion mud in the form of a water solution or it may be dried and added in powdered solid form. When, for example, it is desired to reduce the filtration rate of a drilling mud, either the aforementioned solution or the powdered form may be incorporated with the fluid at a suitable point in the circulation system, such as in the mud ditch. It may be desirable, of course, to use a mixing device, such as the cone and jet mixer, or the equivalent thereof.

The amount of hydrocarbon oil employed will depend upon a number of factors, including the density of the mud and the characteristics of the hydrocarbon oil itself. Ordinarily, the hydrocarbon oil will be added to the aqueous base drilling fluid in an amount in the range of 2% to 35% by weight of the final oil-in-water emulsion mud. Ordinarily, the amount of hydrocarbon oil employed will be in the range from about 4% to about 20% by weight of the final mixture.

In order to demonstrate the effectiveness of water-soluble salts of sulfonated phenol formaldehyde condensation product in reducing the loss of water by filtration from an oil-in-water emulsion drilling fluid, various quantities of this material as well as various quantities of a hydrocarbon oil were added to a stock mud consisting of 18.0 weight per cent Xact clay, a surface clay mined in Texas, 1.6 weight per cent Aquagel clay, a Wyoming bentonitic clay, and 80.4% fresh water. Viscosity, gel strength, and filtration determinations were then made, the data obtained being shown in the table below.

TABLE I

*Effects of oil and sulfonated phenol formaldehyde condensation product on properties of a fresh-water mud [1]*

| Wt. Percent Active [2] SPF Solids in Mud | Volume Percent Oil [3] in Mud | Viscosity at 600 R. P. M. Stormer, cps. | Initial Gel, Grams Stormer | API Filtration Rate, cc. in 30 Min. | cc. of Oil in Filtrate |
|---|---|---|---|---|---|
| 0.00 | 0.0 | 14 | 0 | 11.1 | |
| 0.24 | 0.0 | 18 | 2 | 8.1 | |
| 0.46 | 0.0 | 22 | 3 | 5.9 | |
| 0.89 | 0.0 | 28 | 9 | 4.9 | |
| 1.66 | 0.0 | 32 | 10 | 3.7 | |
| 0.00 | 21.8 | 22 | 1 | 7.6 | 0.8 |
| 0.20 | 21.5 | 26 | 4 | 5.5 | 0.6 |
| 0.39 | 21.2 | 33 | 6 | 4.0 | trace |
| 0.75 | 20.6 | 44 | 10 | 3.1 | none |
| 1.41 | 19.5 | 49 | 13 | 2.2 | none |
| 0.89 | 0.0 | 28 | 9 | 4.9 | |
| 0.85 | 6.1 | 32 | 9 | 4.4 | none |
| 0.81 | 11.5 | 36 | 9 | 3.5 | none |
| 0.78 | 16.6 | 39 | 10 | 3.2 | none |
| 0.75 | 20.6 | 44 | 10 | 3.1 | none |

[1] Stock mud consisted of 18.0% Xact clay, 1.6% Aquagel clay and 80.4% water.
[2] The crude SPF added as a 30% aqueous solution. Per cent in mud based on active component only.
[3] Kerosene oil.

These data show that the water-soluble salts of sulfonated phenol formaldehyde condensation product markedly reduce the filtration rate of an oil-in-water emulsion mud without excessively increasing its viscosity or materially altering its gel strength. These data further show that an oil-in-water emulsion mud containing this material loses substantially none of the oil therefrom.

In order to demonstrate that the water-soluble salts of sulfonated phenol formaldehyde condensation product effectively prevent loss of water by filtration from an oil-in-water emulsion mud even though substantial quantities of sodium chloride are present, various quantities of this product as well as various quantities of a hydrocarbon oil were added to a stock mud consisting of 26 weight per cent Baroco clay, a surface clay mined in Texas, dispersed in 74% of a 5% sodium chloride solution. The viscosity, gel strength, and filtration rates obtained in these determinations are included in the table below:

TABLE II

*Effects of oil and sulfonated phenol formaldehyde condensation product on properties of a 5% salt-water mud [1]*

| Wt. Percent Active [2] SPF Solids in Mud | Volume Percent Oil [3] in Mud | Viscosity at 600 R. P. M. Stormer, cps. | Initial Gel, Grams Stormer | API Filtration Rate, cc. in 30 Min. | cc. of Oil in Filtrate |
|---|---|---|---|---|---|
| 0.00 | 0 | 28 | 31 | 31.0 | |
| 0.24 | 0 | 28 | 29 | 10.5 | |
| 0.46 | 0 | 28 | 26 | 7.9 | |
| 0.89 | 0 | 29 | 24 | 5.6 | |
| 1.66 | 0 | 30 | 17 | 3.9 | |
| 0.00 | 23.3 | 62 | 70 | 18.1 | 2.0 |
| 0.20 | 22.9 | 60 | 66 | 8.6 | trace |
| 0.39 | 22.5 | 58 | 57 | 5.8 | trace |
| 0.75 | 21.8 | 54 | 43 | 3.6 | none |
| 1.41 | 20.7 | 52 | 30 | 2.5 | none |
| 0.89 | 0.0 | 29 | 24 | 5.6 | |
| 0.85 | 6.5 | 37 | 27 | 5.1 | none |
| 0.81 | 12.3 | 43 | 32 | 4.5 | none |
| 0.78 | 17.3 | 48 | 41 | 4.2 | none |
| 0.75 | 21.8 | 54 | 43 | 3.6 | none |

[1] Stock mud consists of 26% Baroco clay dispersed in 74% of 5% salt solution.
[2] The crude SPF added as a 30% aqueous solution. Percent in mud based on active component only.
[3] Diesel fuel oil.

The data in the foregoing table show that water-soluble salts of sulfonated phenol formaldehyde condensation product markedly reduce the filtration rate of an oil-in-water emulsion mud even though substantial quantities of sodium chloride are present. These data also show that substantially no oil is lost from the oil-in-water emulsion by filtration therefrom.

It will be apparent that the water-soluble salts of sulfonated phenol formaldehyde reaction product prepared in the manner hereinbefore described possess all the desirable qualities of an emulsifying agent in oil-in-water emulsion muds. This material emulsifies the oil in both fresh- and salt-water muds; it markedly reduces the loss of water by filtration from both fresh-water and salt-water muds; it does not materially increase the viscosity of either fresh-water or salt-water mud; and its effectiveness is not reduced by saline contaminants in the mud.

Having fully described my invention, what I wish to claim as new and novel and to secure by Letters Patent is:

1. An oil-in-water emulsion drilling fluid comprising finely divided solid inorganic material, water, a hydrocarbon oil in an amount in the range of 2% to 35% by weight of the drilling fluid, and a water-soluble salt of sulfonated phenol formaldehyde condensation product, said product being present in an amount in the range of 0.1 weight per cent to 3.0 weight per cent of the fluid, said water soluble salt being prepared by condensing approximately equimolar quantities of a monosulfonated di-functionally reactive phenol with formaldehyde in the presence of a condensation catalyst at a temperature in the range of 60° to 100° C. for a time sufficient to form a high molecular weight product but for a time insufficient to cause the high molecular weight product to become insoluble in water, said high molecular weight product being neutralized with an alkaline inorganic agent capable of reacting with said high molecular weight product to form a water soluble salt, the reaction between the monosulfonated di-functionally reactive phenol and formaldehyde being permitted to continue for a time sufficient to form said condensation product having, when neutralized, a viscosity of at least about 5 centipoises at 26° C. when 7.15 weight per cent of said neutralized product, based on the weight of the phenol reacted, is dissolved in water.

2. An oil-in-water emulsion drilling fluid in accordance with claim 1 in which the hydrocarbon oil is gass oil.

3. A method of reducing the filtration rate of an aqueous-base drilling fluid which comprises the steps of adding to said fluid a hydrocarbon oil and a water-soluble salt of sulfonated phenol formaldehyde condensation product, said hydrocarbon oil and said salt being added in amounts in the range of 2% to 35% by weight and in the range of 0.1% to 3.0% by weight of the drilling fluid, respectively, sufficient to reduce the loss of water from said fluid by filtration, said water soluble salt being prepared by condensing approximately equimolar quantities of a monosulfonated di-functionally reactive phenol with formaldehyde in the presence of a condensation catalyst at a temperature in the range of 60° to 100° C. for a time sufficient to form a high molecular weight product but for a time insufficient to cause the high molecular weight product to become insoluble in water, said high molecular weight product being neutralized with an alkaline inorganic agent capable of reacting with said high molecular weight product to form a water soluble salt, the reaction between the monosulfonated di-functionally reactive phenol and formaldehyde being permitted to continue for a time sufficient to form said condensation product having, when neutralized, a viscosity of at least about 5 centipoises at 26° C. when 7.15 weight per cent of said neutralized product, based on the weight of the phenol reacted, is dissolved in water.

4. A method of treating an aqueous-base drilling fluid to form an oil-in-water emulsion drilling fluid therefrom which comprises treating said aqueous-base drilling fluid with a hydrocarbon oil and a water-soluble salt of sulfonated phenol formaldehyde condensation product, said hydrocarbon oil and said salt being added to the aqueous-base drilling fluid in sufficient quantities to form an oil-in-water emulsion drilling fluid containing from about 2.0% to 35% by weight of said hydrocarbon oil and from 0.1% to 3.0% by weight of said water-soluble salt, said water soluble salt being prepared by condensing approximately equimolar quantities of a monosulfonated di-functionally reactive phenol with formaldehyde in the presence of a condensation catalyst at a temperature in the range of 60° to 100° C. for a time sufficient to form a high molecular weight product but for a time insufficient to cause the high molecular weight product to become insoluble in water, said high molecular weight product being neutralized with an alkaline inorganic agent capable of reacting with said high molecular weight product to form a water soluble salt, the reaction between the monosulfonated di-functionally reactive phenol and formaldehyde being permitted to continue for a time sufficient to form said condensation product having, when neutralized, a viscosity of at least about 5 centipoises at 26° C. when 7.15 weight per cent of said neutralized product, based on the weight of the phenol reacted, is dissolved in water.

5. A method in accordance with claim 4 in which the hydrocarbon oil is a gas oil.

6. A method in accordance with claim 4 in which the water-soluble salt of sulfonated phenol formaldehyde condensation product possesses such characteristics that the 7.15% by weight solution thereof possesses a viscosity at 26° C. in the range of 5 to about 400 centipoises.

7. An oil-in-water emulsion drilling fluid in accordance with claim 1 in which the water soluble salt is a sodium salt.

8. A method in accordance with claim 3 in which the water soluble salt is a sodium salt.

9. A method in accordance with claim 4 in which the water soluble salt is a sodium salt.

10. An oil-in-water emulsion drilling fluid comprising a mixture of 18% by weight of Texas surface clay and 1.6% by weight of Wyoming bentonite, 80.4% by weight of water, a hydrocarbon oil in an amount in the range of 4% to about 20% by weight of the drilling fluid and a sodium salt of sulfonated phenol formaldehyde condensation product in an amount in the range of 0.2% to 1% by weight of the drilling fluid, said sodium salt being prepared by condensing approximately equimolar quantities of a monosulfonated di-functionally reactive phenol with formaldehyde in the presence of a condensation catalyst at a temperature in the range of 60° to 100° C. for a time sufficient to form a high molecular weight product but for a time insufficient to cause the high molecular weight product to become insoluble in water, said high molecular weight product being neutralized with a sodium hydroxide solution capable of reacting with said high molecular weight product to form a water soluble salt, the reaction between the monosulfonated di-functionally reactive phenol and formaldehyde being permitted to continue for a time sufficient to form said condensation product having, when neutralized, a viscosity of at least about 5 centipoises at 26° C. when 7.15 weight per cent of said neutralized product, based on the weight of the phenol reacted, is dissolved in water.

11. An oil-in-water emulsion drilling fluid comprising 26% by weight of Texas surface clay, 74% by weight of water, a hydrocarbon oil in an amount in the range of about 4% to about 20% of the drilling fluid and a sodium salt of sulfonated phenol formaldehyde condensation product in the range of 0.2% to 1% by weight of the drilling fluid, said sodium salt being prepared by condensing approximately equimolar quantities of a monosulfonated di-functionally reactive phenol with formaldehyde in the presence of a condensation catalyst at a temperature in the range of 60° to 100° C. for a time sufficient to form a high molecular weight product but for a time insufficient to cause the high molecular weight product to become insoluble in water, said high molecular weight product being neutralized with a sodium hydroxide solution capable of reacting with said high molecular weight product to form a water soluble salt, the reaction between the monosulfonated di-functionally reactive phenol and formaldehyde being permitted to continue for a time sufficient to form said condensation product having, when neutralized, a viscosity of at least about 5 centipoises at 26° C. when 7.15 weight per cent of said neutralized product, based on the weight of the phenol reacted, is dissolved in water.

12. An oil-in-water emulsion drilling fluid in accordance with claim 1 in which the water is salt water.

13. A method in accordance with claim 3 in which the aqueous base for the drilling fluid is salt water.

References Cited in the file of this patent

UNITED STATES PATENTS

| | | |
|---|---|---|
| 2,040,212 | Orthner | May 12, 1936 |
| 2,331,281 | Wayne | Oct. 12, 1943 |
| 2,550,236 | Fischer et al. | Apr. 24, 1951 |
| 2,555,794 | Dawson | June 5, 1951 |
| 2,568,992 | Doscher | Sept. 25, 1951 |
| 2,639,274 | Salathiel | May 19, 1953 |
| 2,681,312 | Salathiel | June 15, 1954 |

OTHER REFERENCES

"Emulsion and Foams," Berkman and Egloff (1941), page 190, lines 24 to 27 inclusive. Copy in Div. 64.